United States Patent
Nordmark (10) Patent No.: US 8,254,383 B2
(45) Date of Patent: Aug. 28, 2012

(54) METHOD AND SYSTEM FOR ROUTING USING MULTI-STAGE ROUTE ENTRY LOOKUP

(75) Inventor: Erik Nordmark, Mountain View, CA (US)

(73) Assignee: Oracle America, Inc., Redwood City, CA (US)

(*) Notice: Subject to any disclaimer, the term of this patent is extended or adjusted under 35 U.S.C. 154(b) by 593 days.

(21) Appl. No.: 12/242,373

(22) Filed: Sep. 30, 2008

(65) Prior Publication Data

US 2010/0080225 A1    Apr. 1, 2010

(51) Int. Cl.
*H04L 12/28* (2006.01)
*H04L 12/56* (2006.01)

(52) U.S. Cl. ......................... 370/389; 370/392

(58) Field of Classification Search ............ 370/395.31, 370/401, 224, 392, 231, 235, 242, 351, 389, 370/396, 395.5
See application file for complete search history.

(56) References Cited

U.S. PATENT DOCUMENTS

| | | | |
|---|---|---|---|
| 2002/0080798 A1* | 6/2002 | Hariguchi et al. | 370/395.31 |
| 2004/0085962 A1* | 5/2004 | Sugai et al. | 370/392 |
| 2007/0083638 A1* | 4/2007 | Pinkerton et al. | 709/224 |

* cited by examiner

*Primary Examiner* — Kwang B Yao
*Assistant Examiner* — Adam Duda
(74) *Attorney, Agent, or Firm* — Osha Liang LLP

(57) ABSTRACT

The invention relates to a method for routing packets. The method includes receiving a first packet to route, obtaining a first route entry using a first IP address associated with the first packet, where the first route entry includes a first prefix, a first route nexthop generation (RNG) and a first route nexthop pointer (RNP) to a second route entry. The method further includes comparing a route generation (RG) for the second route entry with the first RNG where the RG for the second route entry and the first RNG are equal, obtaining a first neighbor cache entry (NCE) from a first NCE pointer (NP) stored in the first route entry, and routing the first packet using the ARP information in the first NCE, where a route dependency list pointer (RDLP) in the second route entry points to the first route entry.

20 Claims, 9 Drawing Sheets

METHOD AND SYSTEM FOR ROUTING USING MULTI-STAGE ROUTE ENTRY LOOKUP

BACKGROUND

Data is communicated between computers over networks, such as the Internet. The data is typically communicated over the network as a series of packets using, for example, Internet Protocol. Typically, the packets are communicated from one computer to another using one or more routers. Each router is configured to receive packets and determine where to forward the packet. Often, this determination is made in a manner that delivers the packet to its destination with the fewest number of routers (or other devices) being involved.

In order for a router to determine where to forward a given packet, the router maintains information about what devices (e.g., computers, other routers, etc.) it is connected to on the network. In addition, the router may also include information about what each of the aforementioned devices is connected to on the network. Using this information, the router can determine the most efficient path to move the packet directly to or closer to its destination.

As the size of networks grow, the information maintained by a given router increases. As a result, the overhead required to maintain the information in the router also increases. For example, if the network topology in which a router is located changes (e.g., one of the devices to which the router is connected becomes unavailable), the router must take steps to update its information. Given the amount of information maintained by the router, the overhead required to keep the information in the router current may be significant.

SUMMARY

In general, in one aspect, the invention relates to A method for routing packets, comprising receiving a first packet to route, wherein the first packet comprises a first Internet Protocol (IP) address, obtaining a first route entry using the first IP address, wherein the first route entry comprises a first prefix, a first route nexthop generation (RNG) and a first route nexthop pointer (RNP) to a second route entry, comparing a route generation (RG) for the second route entry with the first RNG, wherein the RG for the second route entry and the first RNG are equal and wherein the RG for the second route entry is stored in the second route entry, obtaining a first neighbor cache entry (NCE) from a first NCE pointer (NP) stored in the first route entry, wherein the first NCE comprises address resolution protocol (ARP) information corresponding to the second route entry, and routing the first packet using the ARP information in the first NCE, wherein a route dependency list pointer (RDLP) in the second route entry points to the first route entry.

In general, in one aspect, the invention relates to a method for routing packets, comprising receiving a first packet to route, wherein the first packet comprises a first Internet Protocol (IP) address, obtaining a first route entry using the first IP address, wherein the first route entry comprises a first prefix, a first gateway, a first route nexthop generation (RNG) and a first route nexthop pointer (RNP) set to NULL, locating a second route entry using the first gateway comprising the first gateway, determining that a prefix in the second route entry corresponds to a subnet, creating a third route entry, setting a prefix in the third route entry using the first gateway, setting the first RNP to point to the third route entry, recording a route generation (RG) for the third route entry in the first RNG, creating a first NCE using the first gateway, setting a NP in the first route entry to point to the first NCE, wherein the first NCE comprises address resolution protocol (ARP) information corresponding to the third route entry, and routing the first packet using the ARP information in the first NCE, wherein a route dependency list pointer (RDLP) in the third route entry points to the first route entry.

In general, in one aspect, the invention relates to a router, comprising a plurality of network interfaces configured to receive packets from a network and send packets to the network, a processor, a memory comprising instructions executable by the processor to route packets received from the plurality of network interfaces, the method comprising: receiving a first packet to route, wherein the first packet comprises a first Internet Protocol (IP) address, obtaining a first route entry using the first IP address, wherein the first route entry comprises a first prefix, a first route nexthop generation (RNG) and a first route nexthop pointer (RNP) to a second route entry, comparing a route generation (RG) for the second route entry with the first RNG, wherein the RG for the second route entry and the first RNG are equal and wherein the RG for the second route entry is stored in the second route entry, obtaining a first neighbor cache entry (NCE) from a first NCE pointer (NP) stored in the first route entry, wherein the first NCE comprises address resolution protocol (ARP) information corresponding to the second route entry, and routing the first packet using the ARP information in the first NCE, wherein a route dependency list pointer (RDLP) in the second route entry points to the first route entry.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method for routing packets. More specifically, embodiments of the invention provide a method and system for routing packets using a multi-stage route entry lookup. Further, embodiments of the invention provide a mechanism for reducing the overhead required to keep the information in a forward information base (FIB) current.

Figure 1:
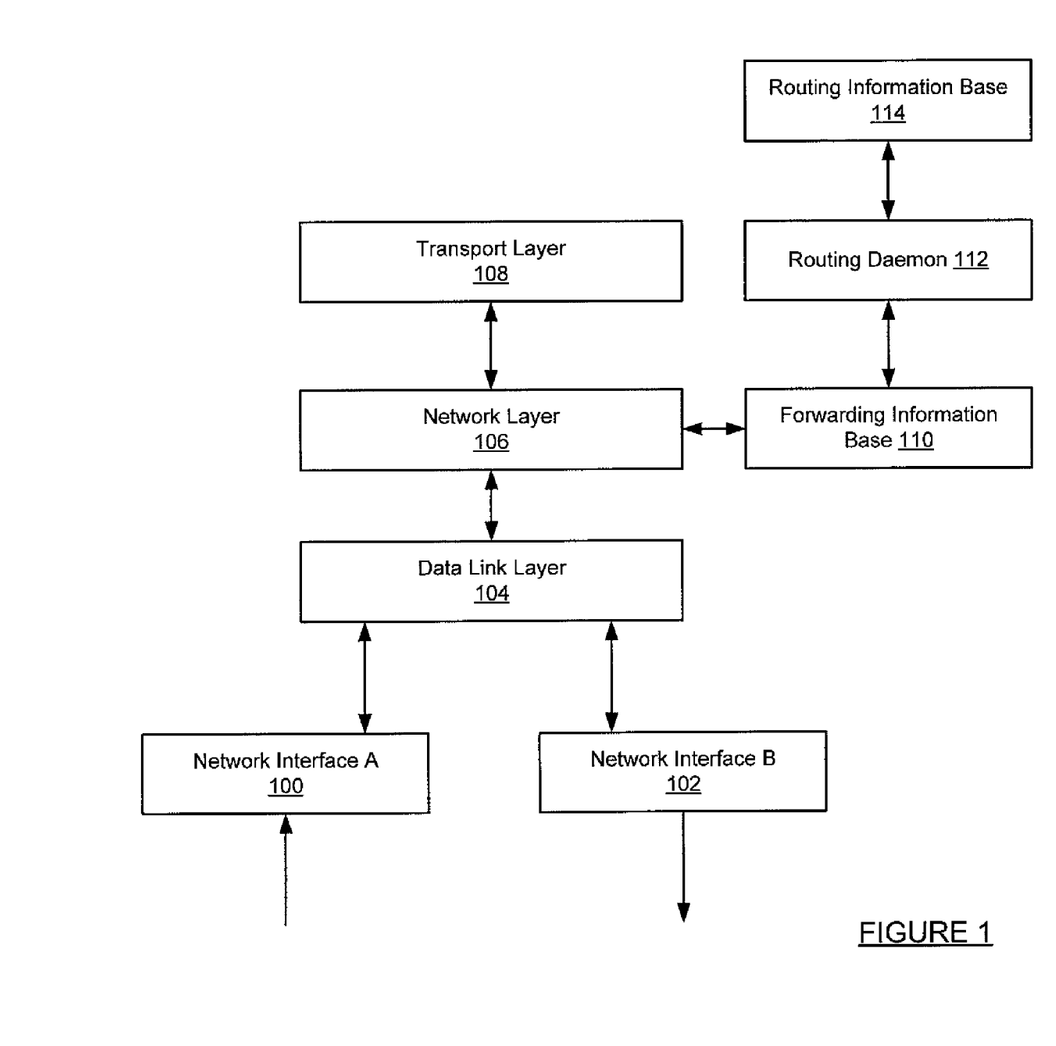
FIG. 1 shows a system in accordance with one or more embodiments of the invention.

FIG. 1 shows a system in accordance with one or more embodiments of the invention. The system includes network interfaces (100, 102) configured to send and receive packets from a network (not shown). The network interfaces (100, 102) may be physical network interfaces or virtual network interface (i.e., network interfaces implemented in software). Regardless of the implementation, the network interfaces (100, 102) are operatively connected to a data link layer (104). The data link layer (104) is configured to implement, among other protocols, the Address Resolution Protocol (ARP) to determine a computer's hardware address (e.g., the media access control (MAC) address) using an Internet Protocol (IP) address of the computer. The data link layer (104) also provides functionality transfer data received from the network layer (106) to the network interfaces (100, 102).

The network layer (106) is configured to implement IP. In addition, the network layer (106) includes functionality to determine a nexthop for a given packet (discussed below) using route entries in the Forwarding Information Base (FIB) (100). The network layer (106) is operatively connected to the transport layer (108). The transport layer is configured to implement Transmission Control Protocol (TCP). The transport layer (108) also provides functionality transfer data to the network layer (106).

Figure 7:
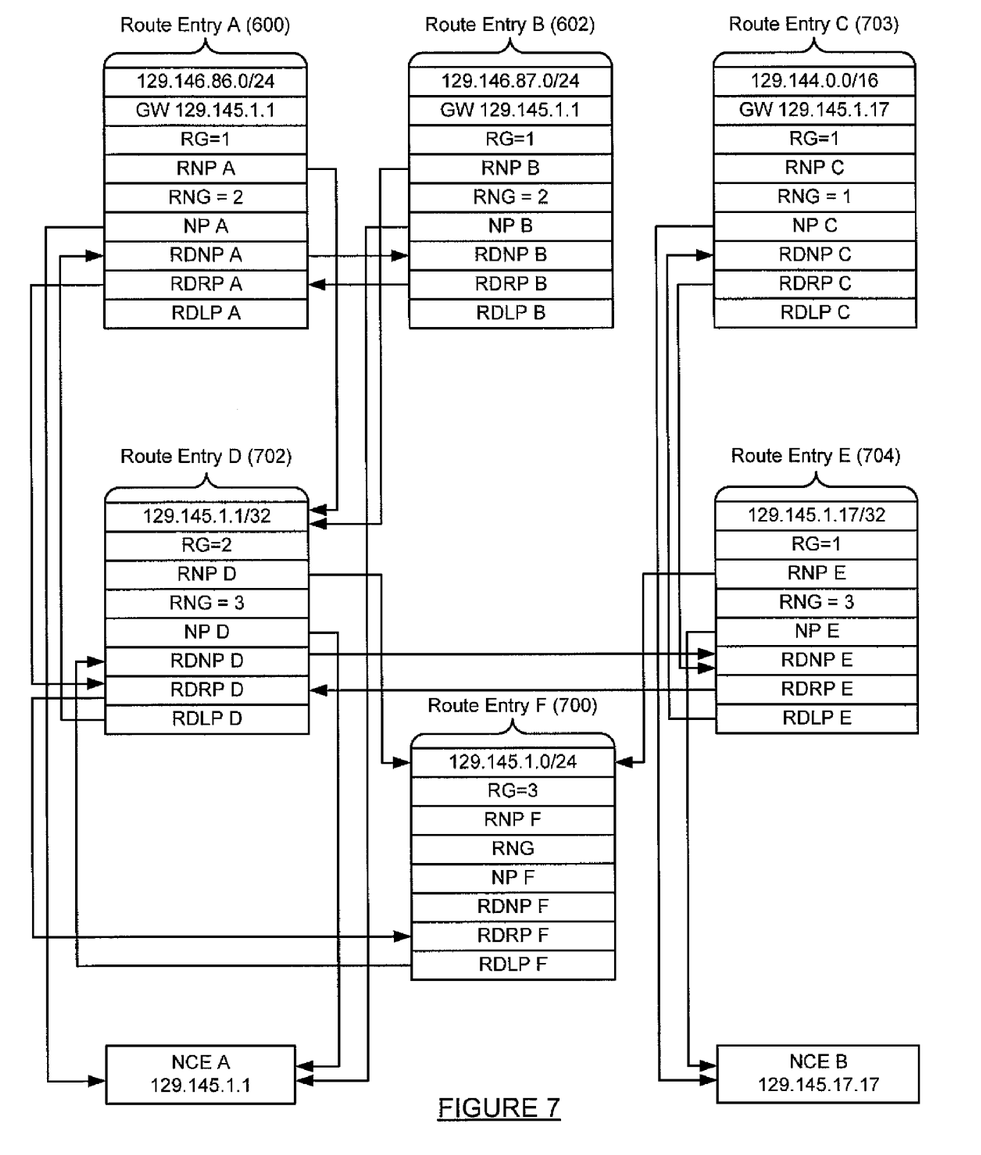

In one embodiment of the invention, the FIB (110) includes route entries (discussed below in FIG. 2) and neighbor cache entries (NCEs). Each NCE may include, but is not limited to, ARP information (i.e., information obtained using ARP) (e.g., MAC address or Ethernet Hardware Address (EHA)), and information about the age of the NCE. In one embodiment of the invention, there is one unique NCE for each route entry corresponding to an interface except in the situation in which the interface covers a subnet. In such cases, there is one unique NCE for each cloned interface route. In one embodiment of the invention, the NCEs are created as needed and, as such, at any given time the FIB may not include a unique NCE for each interface or clone interface. An example of a cloned interface is shown in FIG. 7. Returning to FIG. 1, in one embodiment of the invention, the route entries in the FIB (110) are organized in a tree structure such as a Patricia Tree (also known as Radix Tree or a Crit Bit Tree). Those skilled in the art will appreciate that other data structures may be used to organize the route entries in the FIB (110).

In one embodiment of the invention, the route entries in the FIB (110) are generated by a routing daemon (112). More specifically, the routing daemon (112) is configured to use information from a routing information base (RIB) (114) to determine new routes, and identify routes which no longer exist. When a new route is determined, the routing daemon (112) generates a new route entry and stores it in the FIB (110). The routing daemon (112) is also configured to update the FIB (110) in response to identifying a route that no longer exists.

In one embodiment of the invention, if the invention is implemented on a host computer, then the data link layer (104), the network layer (106), the transport layer (108), and the FIB (110) are executing and/or located in the operating system kernel. The routing daemon (112) and the RIB (114) are executing and/or located in the user level.

In one embodiment of the invention, if the invention is implemented in a router, then the FIB, the RIB, the routing daemon, and routing software (i.e., software used to route packets using the FIB) may be implemented in the router. In such cases, the router may not include, for example, software configured to perform the functionality of the transport layer.

Figure 2:
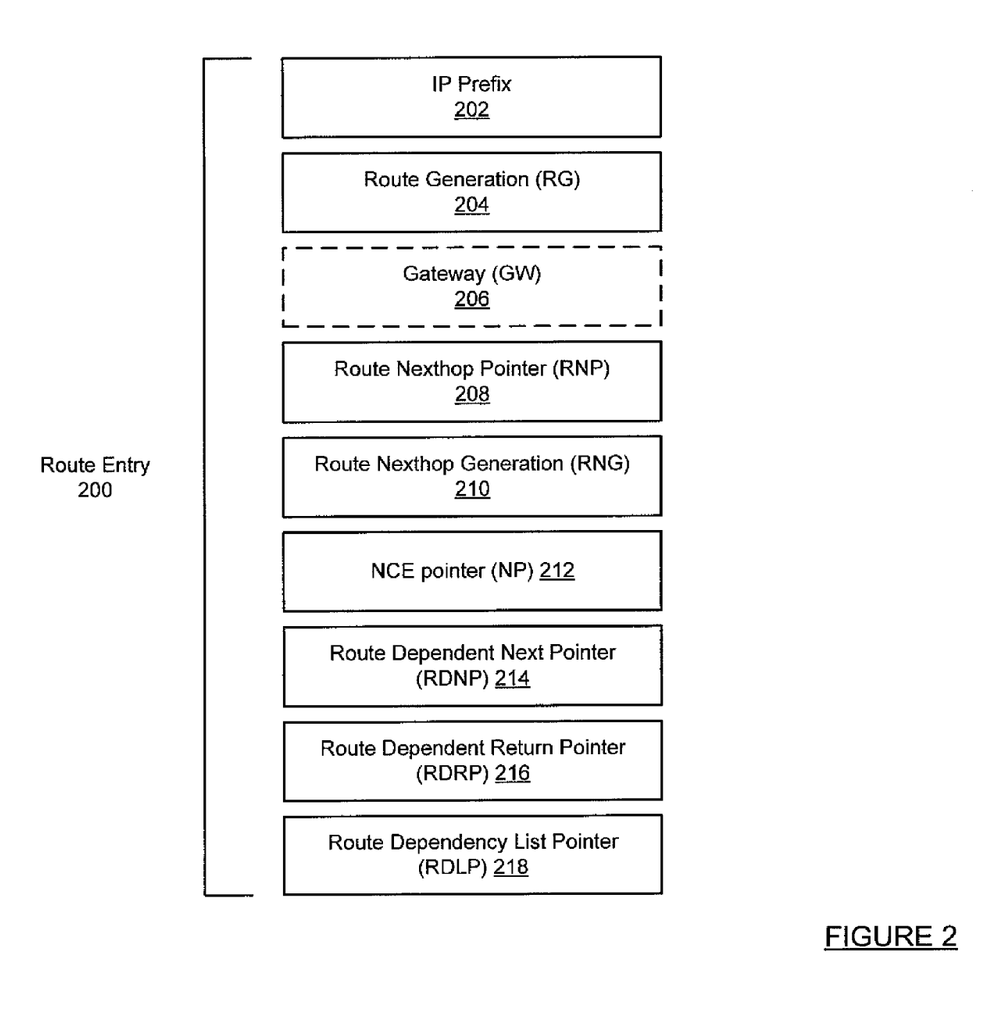
FIG. 2 shows a route entry in accordance with one or more embodiments of the invention.

FIG. 2 shows a route entry in accordance with one or more embodiments of the invention. In one embodiment of the invention, the route entry (200) includes but is not limited to the following components: (i) an IP prefix (202)—an IP address and a netmask (e.g., 129.144.0.0/16); (ii) a route generation (204)—an integer corresponding to the current generation of the route entry; (iii) a gateway (optional)—an IP address for the gateway corresponding to the IP prefix; (iii) a route nexthop pointer (RNP)—a pointer to another route entry that corresponds the gateway; (iv) a route nexthop generation (RNG)—an integer corresponding to the current generation of the route entry referenced by the RNP; (v) NCE pointer (NP)—a pointer to the NCE for the route entry; (vi) a route dependent next pointer (RDNP)—a pointer to another route entry that is dependent on the same route nexthop as the route entry; (v) a route dependent return pointer (RDNP)—a pointer to another route entry that is dependent on the same route nexthop as the route entry (or points to the route entry corresponding to the route nexthop); and a route dependency list pointer—a pointer to another route entry that is dependent on the route entry (i.e., a route entry dependent on route entry (200)).

In one embodiment of the invention, if the route entry is for an interface (i.e., physical or virtual network interface) then the route entry does not include a gateway component.

The RG component provides a mechanism to enable other route entries dependent on the route entry (e.g., route entries dependent on route entry (200)) to determine whether their dependence on the route entry is valid. The RNG component provides a mechanism to enable the route entry (e.g., route route entry (200)) to determine whether its dependences on the route entry corresponding to the route nexthop is valid.

The RDLP components provides a mechanism to track which other route entries are dependent upon the route entry. The RDNP and RDRP components enable the route entry to be identified as dependent on another route entry from which it has a pointer (e.g., the RDNP or RDNP and RDRP may be used to identify the route entry as dependent on the route entry obtained using the RNP).

In one embodiment of the invention, in addition to storing route entries corresponding to routes identified by the routing daemon, the FIB may also store the route entries corresponding to one or more of the following: (i) loopback route entry—IP address 127.0.0.1 and the corresponding IPv6 counterpart (::1); (ii) local route entry—a route entry for an IP address assigned to the host (there may be multiple local route entries if there are multiple IP addresses assigned to the host); (iii) broadcast route entry—a route entry for a IP broadcast address the host supports (there may be multiple broadcast route entries if the host supports multiple IP broadcast addresses); (iv) a multicast route entry—a route entry (one for each interface) that matches the IP multicast range (224.0.0.0/4 and ff00::0/8); and (v) a no route entry—a route entry which serves to signal the network layer that no matching route entry was found.

Figure 3:
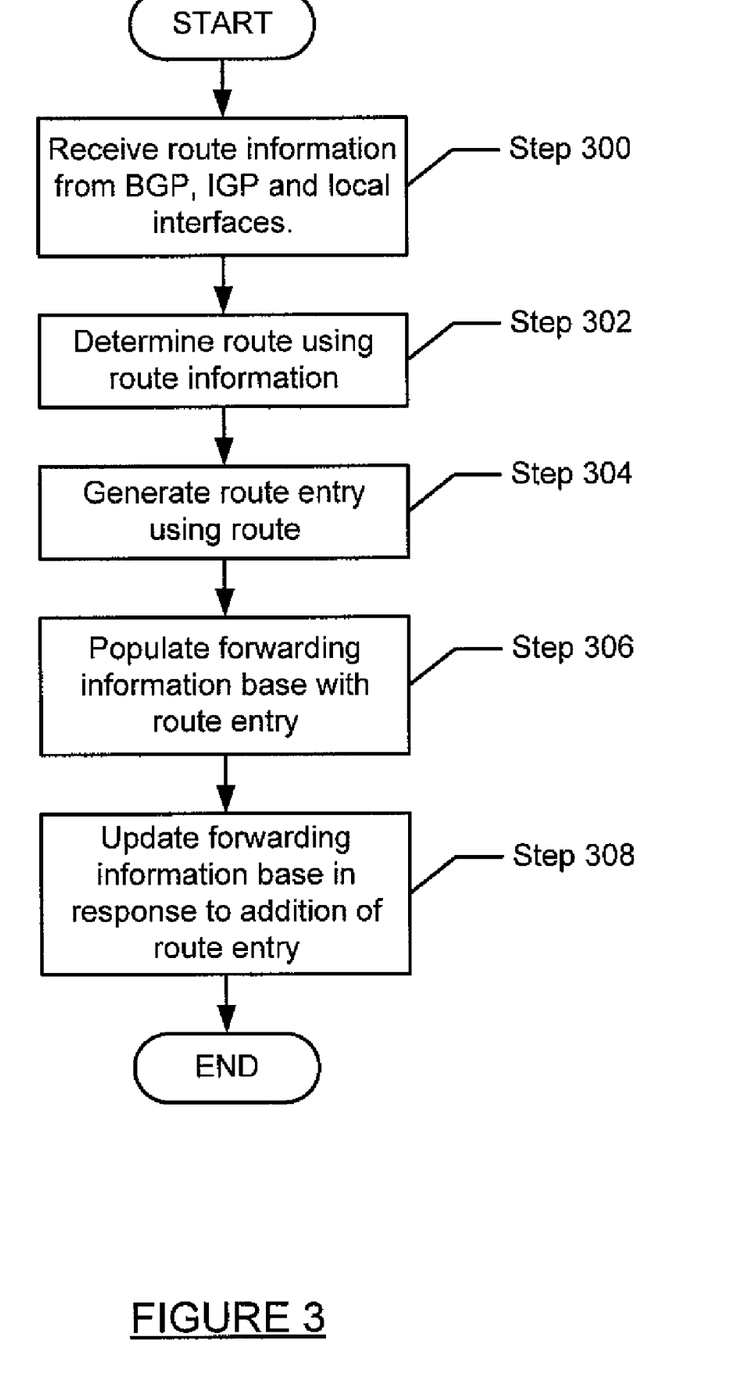
FIGS. 3-5 show methods in accordance with one or more embodiments of the invention.
Figure 4:
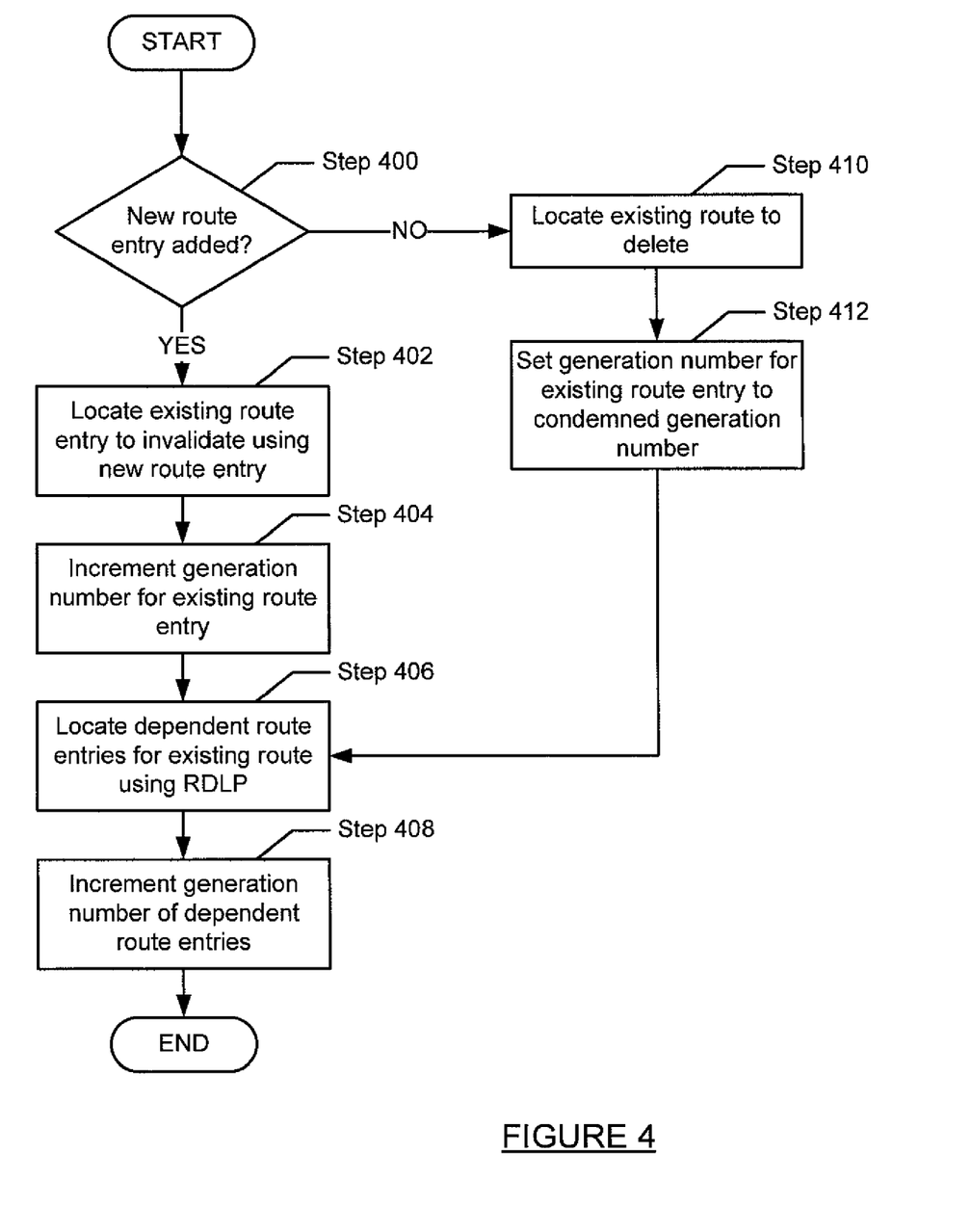
Figure 5:
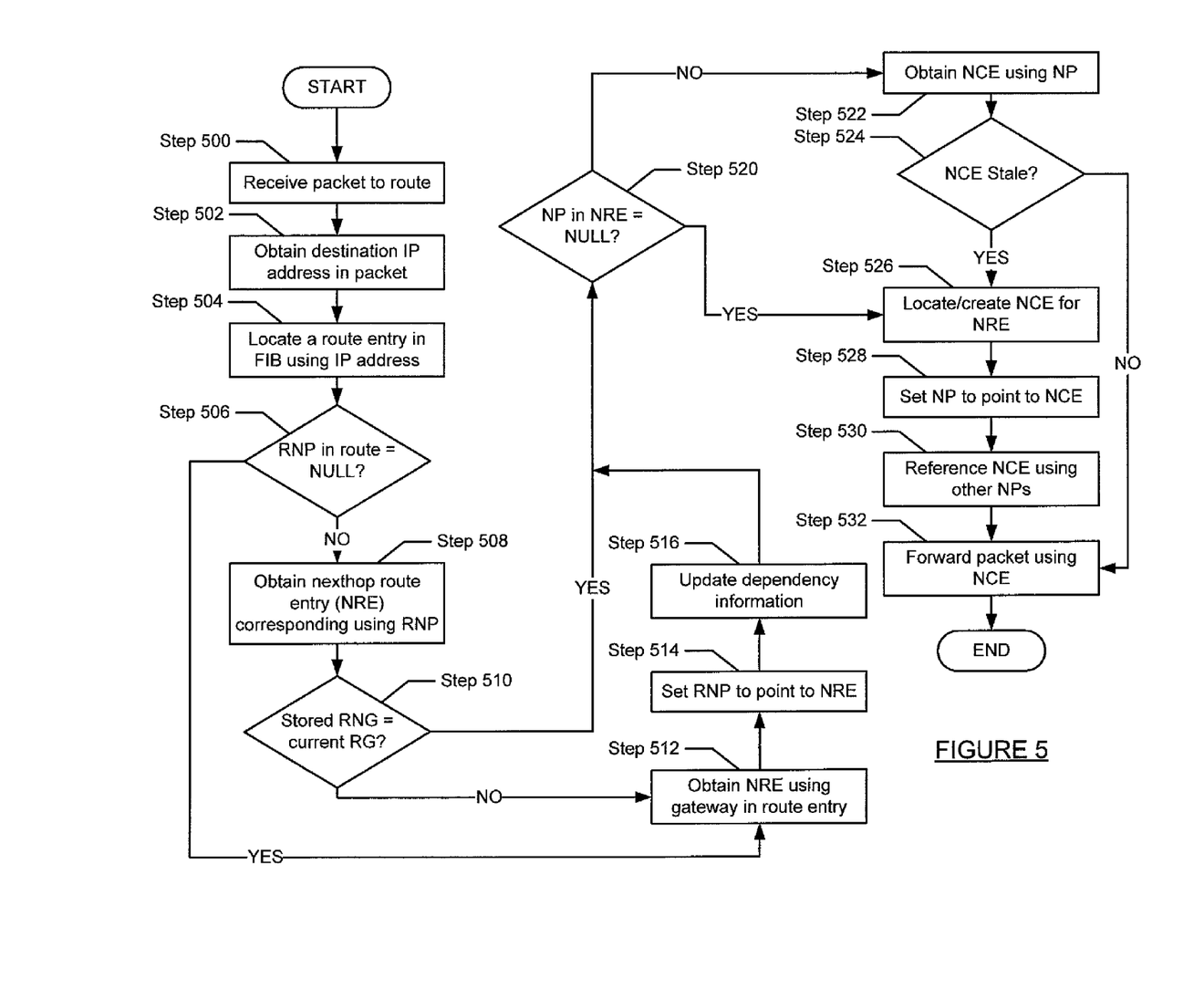

FIGS. 3-5 show a flow charts in accordance with one or more embodiments of the invention. In one or more embodiments of the invention, one or more of the steps described below may be omitted, repeated, and/or performed in a different order. Accordingly, the specific arrangement of steps shown in FIGS. 3-5 should not be construed as limiting the scope of the invention. Further, the methods shown in FIGS. 3-5 may be performed in parallel.

FIG. 3 shows a method for creating a route entry in accordance with one embodiment of the invention. In Step 300, route information is received from Border Gateway Protocol (BGP), Internal Gateway Protocols (IGP) (e.g., Open Shortest Path First (OSPF) protocol, Intermediate System-to-Intermediate System (IS-IS) protocol, etc.), network interface configuration information, or any other source.

In Step 302, the information in Step 300 is used to determine new routes. In Step 304, a route entry is created for each new route determined in Step 302. In one embodiment of the invention, creating a route entry includes populating a route entry with a IP prefix and a corresponding gateway (if appropriate). In addition, a RG for the route is generated and stored in the route entry. The remainder of the components are either set to NULL or otherwise not filled in (e.g., the RNG is not filled it at the time of creating the route entry and the route entry corresponding to route nexthop is not known).

In Step 306, the route entry is added to the FIB. Those skilled in the art will appreciate that manner in which the route entry is added to the FIB may vary based on the organization of the route entries in the FIB.

In Step 308, one or more route entries are updated in response to the addition of the route entry. In one embodiment of the invention, the addition of the route entry may not impact any of the previously stored route entries and, as such, the route entries are not updated. However, in other cases, the addition of the route entry may invalidate previous linkages between route entries. For example, consider a scenario in which the FIB includes the following route entries: (i) Route Entry A—Prefix 1, GW=10.1.2.3, and RNP=Route Entry B and (ii) Route Entry B=IP Prefix 10.1.0.0/16. Further, assume that Route Entry C has an IP Prefix 10.1.2.0/24. If Route Entry C is added, then Route Entry C is now the longest match for GW in Route Entry A. In such cases, the route entries must be updated such that Route Entry C and not Route Entry B is used when Route Entry A is selected based on, for example, the IP address of the packet to be forwarded.

FIG. 4 shows a method for updating the Forwarding Information Base in accordance with one embodiment of the invention. The method shown in FIG. 4 may be used to update the FIB when a new route entry is added or when a route entry is deleted from the FIB.

In Step 400, a determination is made about whether the update was triggered by the addition of a new route entry to the FIB. If the update was triggered by the addition of a new route entry to the FIB, then the method proceeds to Step 402. If the update was not triggered by the addition of a new route entry to the FIB (i.e., a route entry is to be deleted), then the process proceeds to Step 410.

In Step 402, the existing route entry to invalidate is located. In this context, the term invalidate is used to denote that the existing route entry should not be referenced by one or more of the route entries currently referencing the existing route entry. However, the existing route entry is not deleted from the FIB. In one embodiment of the invention, if the route entries in the FIB are organized using a Patricia Tree, then the existing route entry may be identified by backtracking from the new route entry towards the root of the Patricia Tree. During the backtracking the existing route entry may be identified (i.e., the previously longest matching prefix for a given gateway). Alternatively, the route entries in the FIB may be queried for the existence of the existing route entry. For example, if the new route entry has an IP prefix of 10.2.3.0/24, then the existing IP prefix to invalidate could be e.g., 10.2.0.0/16 or 10.0.0.0/8 (if the former was not present). In Step 404, the RG for the existing route entry is incremented.

In Step 406, the route entries dependent on the existing route entry are located using the RDLP in the existing route entry. More specifically, the RDLP is used to locate the first dependent route entry. The RDNP in the first dependent route entry is used to locate, if present, the second dependent route entry. The process continues until the RDNP of one of the dependent route entries is NULL. In one embodiment of the invention, if the RG of the dependent route entry is set to the condemned generation number, the RG is not incremented. In Step 408, for each dependent route entry encountered, the RG of the dependent route entry is incremented. Steps 406 and 408 may occur sequentially for each dependent route entry encountered prior to located additional dependent route entries. In one embodiment of the invention Steps 406 and 408 are repeated recursively until all dependent route entries are identified and update appropriately.

In Step 410, the existing route entry to delete from the FIB is located. The existing route entry may be located using information the routing daemon obtained from the RIB. In Step 412, the RG for the existing route entry is set to a pre-defined condemned generation number. In one embodiment of the invention, the condemned generation number is zero. In one embodiment of the invention, the existing route entry to be deleted is not deleted until all references to the route entry have been removed. However, once the existing route entry is condemned it will not longer be accessible to the network layer for the purpose of routing packets as discussed in FIG. 5. The process then proceeds to Step 406.

FIG. 5 shows a method for traversing the Forwarding Information Base (FIB) to route a packet in accordance with one embodiment of the invention. In Step 500, a packet to route is received. In one embodiment of the invention, the packet includes an IP address corresponding to the destination of the packet. In Step 502, the destination IP address is obtained from the packet. In Step 504, a route entry is located in the FIB using the destination IP address. In Step 506, a determination is made about whether the RNP of the route entry is NULL. If the RNP of the route entry is NULL, then the method proceeds to Step 514. If the RNP of the route entry is not NULL, then the method proceeds to Step 508. In Step 508, the route entry correspond to the route nexthop (hereafter "nexthop route entry" (NRE)) is obtained using the RNP.

In Step 510, a determination is made about whether the RNG stored in the route entry is equal to the RG in the NRE. If the RNG stored in the route entry is equal to the RG in the NRE, then the process proceeds to Step 520. If the RNG stored in the route entry is not equal to the RG in the NRE, then the process proceeds to Step 512. As discussed above, when the RNG and RG do not match, the previously created pointers are no longer valid because of the addition of a new route entry and/or the deletion of a route entry.

In Step 512, a new NRE is obtained using the gateway in the route entry. In Step 514, the RNP of route entry is set to point to the NRE. In Step 516, the dependency information for the NRE is update to reflect that the route entry is now dependent on the NRE. More specifically, either the RDLP of the NRE is set to point to the route entry or a RDNP of another route entry dependent on the NRE is set to point to the route entry. In addition, the RDRP of the route entry is set to point to the NRE or to another route entry dependent on the NRE. Finally, the RG of the NRE is stored in the RNG of the route entry.

In Step 520, a determination is made about whether the NP (obtained from the route entry obtained in Step 504) in the NRE is NULL (i.e., has a NCE for the interface been previously located and/or created). If the NP is NULL, then the method proceeds to Step 526. If the NP is not NULL, then the process proceeds to Step 522.

In Step 522, the NCE is obtained using the NP. In Step 524, a determination is made about whether the NCE is stale (i.e., the date in the NCE is no longer valid or must be revalidated, e.g., because the ARP information in the NCE was only valid for a particular duration of time and that duration has expired). In Step 526, the NCE is located/created or, if appropriate, revalidated. In Step 528, the NP in the NRE is set to point to the NCE. In Step 530, the NP of other route entries is updated. Specifically, the NP of route entries dependent (directly or indirectly) on the NRE is updated to point to the NCE. In Step 532, the packet is forwarded using the NCE information.

In one embodiment of the invention, once the route entry is located in Step 504, the RG of the NRE and the RNG may be compared without obtaining the NRE. If the RG is equal to the NRE and the NP in the route entry is not NULL, then the NP in the route entry may be used to obtain the NCE directly (as opposed to going through the NRE). Depending on the number of route entries between the first route entry matching the destination IP address and the route entry corresponding to the interface, the aforementioned method may be modified to perform the fewest number of route entry lookups required to confirm that all of the route entries between first route entry matching the destination IP address and the route entry corresponding to the interface have not changed (i.e., the generation numbers have not changed) since there route entries were linked together.

In one embodiment of the invention, FIG. 5 may include an additional step between (i) Step 510 and Step 520 and (ii) Step 516 and Step 520. Specifically, in situations in which the dependencies between the route entries need to be updated (for reasons discussed above and below). In particular, in the additional step (denoted Step 518) a determination is made about whether the NRE is an interface. This determination may be extended to include whether the NRE is a cloned interface (discussed below in FIG. 7). If the NRE is an interface (or a cloned interface), then the process proceeds to Step 520. If the NRE is not an interface (or a cloned interface), then the process proceeds to Step 506. More specifically, if the NRE is not interface (or a cloned interface), the route entries in the FIB continue to be traversed using the method of Steps 506-518 until a route entry correspond to an interface (or cloned interface) is located.

The following figures show examples in accordance with one or more embodiments of the invention. The examples are not intended to limit the scope of the invention.

Figure 6:
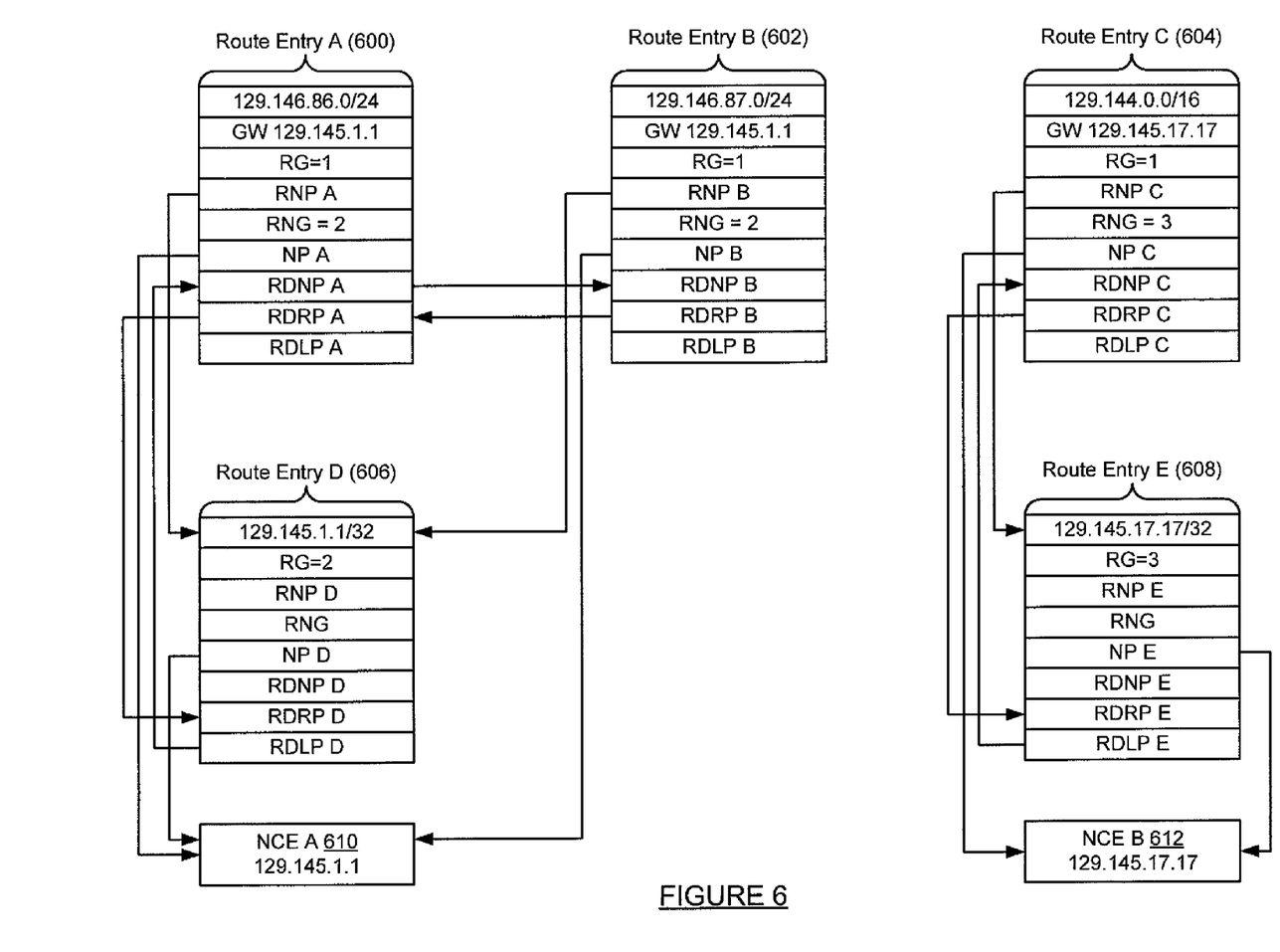
FIGS. 6-8 show examples in accordance with one or more embodiments of the invention.

Referring to FIG. 6, FIG. 6 shows a FIB that includes five route entries: Route Entry A (600), Route Entry B (602), Route Entry C (604), Route Entry D (606), Route Entry E (608) and two NCEs: NCE A (610), NCE B (612).

Route Entry A (600) includes the IP Prefix 129.146.86.0/24 and a gateway (GW) 129.145.1.1. Route Entry A (600) does not correspond to an interface. Accordingly, using the corresponding GW, Route Entry D (606) is located. Route Entry D (606) corresponds to an interface and includes the IP Prefix 129.145.1.1/32 (i.e., an IP Prefix corresponding to a single host). As Route Entry A (600) is dependent on Route Entry D (606), RDLP D points to Route Entry A (600), RDRP A points to Route Entry D (602), and RNP A points to Route Entry D (606). Route Entry D (606) is associated with NCE A (610). Accordingly, NP D is set to point to NCE A (610). Further, NP A is set to point to NCE A (610). Finally, RNG in Route Entry A (600) is set to 2, which corresponds to RG of Route Entry D (606).

Route Entry B (602) includes the IP Prefix 129.146.87.0/24 and a gateway (GW) 129.145.1.1. Route Entry B (602) does not correspond to an interface. Accordingly, using the corresponding GW, Route Entry D (606) is located. As Route Entry B (602) is dependent on Route Entry D (606), RDNP A points to Route Entry B (602), RDRP B points to Route Entry A (602), and RNP B points to Route Entry D (606). Further, because Route Entry D (606) is associated with NCE A (610) and Route Entry B (602) is dependent on Route Entry D (606), NP B is set to point to NCE A (610). Finally, RNG in Route Entry B (602) is set to 2, which corresponds to RG of Route Entry D (606).

Route Entry C (604) includes the IP Prefix 129.144.0.0/24 and a gateway (GW) 129.145.17.17. Route Entry C (604) does not correspond to an interface. Accordingly, using the corresponding GW, Route Entry E (608) is located. Route Entry E (608) corresponds to an interface and includes the IP Prefix 129.145.17.17/32 (i.e., an IP Prefix corresponding to a single host). As Route Entry C (604) is dependent on Route Entry E (608), RDLP E points to Route Entry C (604), RDRP C points to Route Entry E (608), and RNP C points to Route Entry E (608). Route Entry E (608) is associated with NCE B (612). Accordingly, NP E is set to point to NCE B (612). Further, NP C is set to point to NCE B (612). Finally, RNG in Route Entry C (600) is set to 3, which correspond to RG of Route Entry E (606).

Referring to FIG. 7, FIG. 7 shows a FIB that includes six route entries: Route Entry A (600), Route Entry B (602), Route Entry C (703), Route Entry D (702), Route Entry E (704), and Route Entry F (700) and two NCEs: NCE A (610), NCE B (612).

In this example, the Route Entry F (700) corresponds to an interface. However, the interface is for a subnet 129.145.1.0/24 and not for a single host. Accordingly, route entries corresponding to single hosts within the interface subnet are created: Route Entry D (702) and Route Entry E (704). These route entries are interface clones are dependent on Route Entry F (700).

Specifically, RNP D is set to Route Entry F (700), RNG D is set to 3 (i.e., the RG of Route Entry F (700)), RDNP D is set to Route E (704), RDRP E is set to Route D (702), RNP E is set to Route Entry F (700), RNG E is set to 3 (i.e., the RG of Route Entry F (700)), and RDLP F is set to point to Route Entry D (702). The remaining dependencies between Route Entry A (600), Route Entry B (602), and Route Entry D (702) are equivalent to those described above with respect to FIG. 6.

Figure 8:
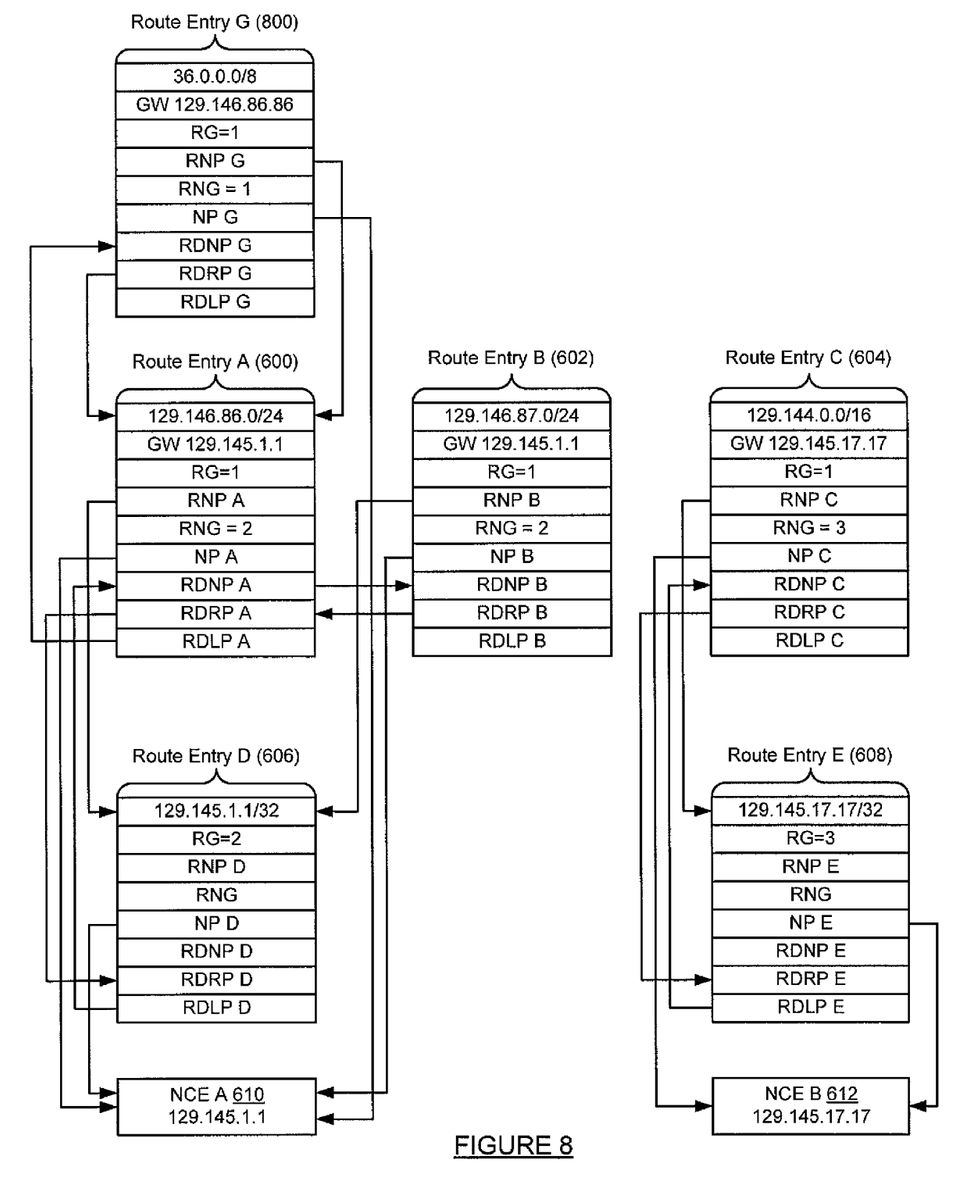

Those skilled in the art will appreciate the while FIGS. 6 and 7 show two levels of route entries, the invention may be used with any number of levels of route entries. For example, FIG. 8 shows an implementation with three levels of route entries. Referring to FIG. 8, the dependencies between Route Entry A (600), Route Entry B (602), and Route Entry D (606) are equivalent to those described above with respect to FIG. 6. Further, the dependencies between Route Entry C (604) and Route Entry E (608) are equivalent to those described above with respect to FIG. 6. In addition, Route Entry G (800) depends on Route Entry A (600) and NCE A (610) in a manner that is equivalent to Route Entry C (604) depending on Route Entry E (608) and NCE B (612).

Embodiments of the invention provide a method and system for creating route entries and tracking the dependency between the route entries. In the event that a given route entry is no longer valid or is to be deleted, the generation number in the dependent route entries are updated. However, the new dependencies do not need to determined for all of the aforementioned updated route entries until such time as the route entry is required to route a packet. Further, the route entries also include the ability to reference the corresponding ARP information for their gateway.

Figure 9:
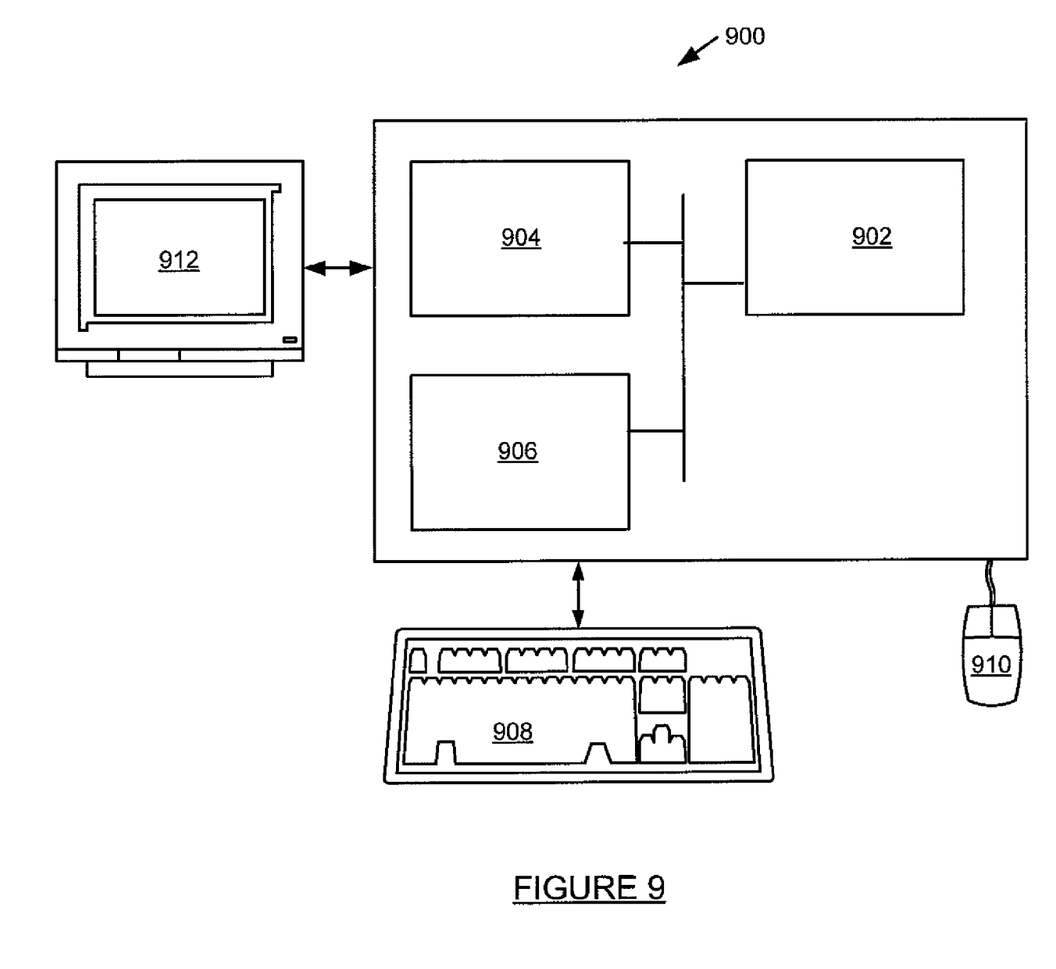
FIG. 9 shows a computer system in accordance with one or more embodiments of the invention.

Embodiments of the invention may be implemented on virtually any type of computer regardless of the platform being used. For example, as shown in FIG. 9, a computer system (900) includes one or more processor(s) (902), associated memory (904) (e.g., random access memory (RAM), cache memory, flash memory, etc.), a storage device (906)

(e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). The computer system (900) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (900) includes at least the minimal processing, input, and/or output means necessary to practice embodiments of the invention.

Further, those skilled in the art will appreciate that one or more elements of the aforementioned computer system (900) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Those skilled in the art will appreciate that one or more embodiments of the invention may be implemented in a router. Further, one or more embodiments of the invention may be implemented in software, hardware, or any combination thereof.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing packets, comprising:
receiving a first packet to route, wherein the first packet comprises a first Internet Protocol (IP) address;
obtaining a first route entry using the first IP address, wherein the first route entry comprises;
a first prefix,
a first route nexthop pointer (RNP) comprising an identifier for a second route entry, and
a first route nexthop generation (RNG) corresponding to a previously obtained route generation (RG) for the second route entry, wherein the previously obtained RG for the second route entry was obtained in response to an update of the first RNP;
obtaining the second route entry using the first RNP, wherein the second route entry comprises a route dependency list pointer (RDLP) and a current RG for the second route entry, and wherein the RDLP comprises an identifier for the first route entry;
determining, by a processor, that the dependence on the second route entry by first route entry is valid by determining that the current RG a route generation (RG) for the second route entry and the first RNG are equal;
upon determining that the dependence on the second route entry by first route entry is valid:
obtaining a first neighbor cache entry (NCE) from a first NCE pointer (NP) stored in the first route entry, wherein the first NCE comprises address resolution protocol (ARP) information corresponding to the second route entry; and
routing the first packet using the ARP information in the first NCE.

2. The method of claim 1, further comprising:
receiving a second packet to route, wherein the second packet comprises a second IP address;
obtaining a third route entry using the second IP address, wherein the third route entry comprises a second prefix, a gateway and a second RNP set to NULL;
locating the second route entry using the gateway;
setting the second RNP to point to the second route entry;
recording the current RG for the second route entry in a third RNG;
obtaining the first NCE using a second NP stored in the second route entry;
setting a third NP in the third route entry to point to the first NCE; and
routing the second packet using the ARP information in the first NCE.

3. The method of claim 2, further comprising:
setting a route dependent next pointer (RDNP) in the first route entry to point to the third route entry.

4. The method of claim 3, further comprising:
determining that a route corresponding to the second route entry is no longer valid;
setting the current RG for the second route to a condemned generation number;
obtaining the first entry using the RDLP in the second entry; and
incrementing a RG for the first route entry.

5. The method of claim 4, further comprising:
obtaining the third entry using the RDNP in the first entry; and
incrementing a RG for the third route entry.

6. The method of claim 4, further comprising:
receiving a third packet to route, wherein the third packet comprises a third IP address;
obtaining the first route entry using the third IP address;
comparing the current RG for the second route entry with the first RNG, wherein the current RG and the first RNG are not equal;
locating a fourth route entry using the gateway;
setting the first RNP to point to the fourth route entry;
recording a RG for the fourth route entry in the first RNG, wherein the RG for the fourth route entry is stored in the fourth route entry;
obtaining a second NCE using a NP stored in the fourth route entry;
setting the NP in the first route entry to point to the second NCE; and
routing the second packet using the ARP information in the second NCE.

7. The method of claim 1, further comprising:
determining that an IP prefix in a third route entry is a longer match for a gateway in the first route entry than the second route entry;
setting the first RNP to point to the third route entry; and
setting the first NP to point to a second NCE, wherein a second NP in the third route entry points to the second NCE, wherein the second NCE comprises ARP information corresponding to the third route entry.

8. A method for routing packets, comprising:
receiving a first packet to route, wherein the first packet comprises a first Internet Protocol (IP) address;
obtaining a first route entry using the first IP address, wherein the first route entry comprises a first prefix, a first gateway, a first route nexthop generation (RNG) and a first route nexthop pointer (RNP) set to NULL;
locating a second route entry using the first gateway comprising the first gateway;
determining that a second prefix in the second route entry corresponds to a subnet;
creating a third route entry;
setting a third prefix in the third route entry using the first gateway;
setting the first RNP to point to the third route entry;
recording a route generation (RG) for the third route entry in the first RNG;
creating a first neighbor cache entry (NCE) using the first gateway;
setting a NCE pointer (NP) in the first route entry to point to the first NCE, wherein the first NCE comprises address resolution protocol (ARP) information corresponding to the third route entry; and
routing the first packet using the ARP information in the first NCE,
wherein a route dependency list pointer (RDLP) in the third route entry points to the first route entry.

9. The method of claim 8, further comprising:
receiving a second packet to route, wherein the second packet comprises a second IP address;
obtaining a fourth route entry using the first IP address, wherein the fourth route entry comprises a second prefix, a second gateway, a second RNG and a second route RNP set to NULL;
locating a second route entry using the second gateway;
determining that the prefix in the second route entry corresponds to the subnet comprising the second gateway;
creating a fifth route entry;
setting a prefix in the fifth route entry using the second gateway;
setting the fourth RNP to point to the fifth route entry;
recording a RG for the fifth route entry in the fourth RNG;
creating a second NCE using the second gateway;
setting a NP in the fourth route entry to point to the second NCE, wherein the second NCE comprises ARP information corresponding to the fifth route entry; and
routing the second packet using the ARP information in the second NCE,
wherein a RDLP in the fifth route entry points to the fourth entry,
wherein a route dependency list pointer (RDNP) in the third route entry points to the fifth route entry.

10. The method of claim 8, wherein a second RNP in the third entry points to the second route entry.

11. The method of claim 10, wherein a RDLP in the second route entry points to the third route entry.

12. The method of claim 8, further comprising:
setting the NP in the first route entry to point to the first NCE, wherein the first NCE comprises ARP information corresponding to the second route entry.

13. The method of claim 8, wherein the first prefix in the first route entry is determined using at least one selected from a group consisting of Open Shortest Path First (OSPF) protocol, Intermediate System-to-Intermediate System (IS-IS) protocol, Border Gateway Protocol (BGP), and network interface configuration information.

14. A router, comprising:
a plurality of network interfaces configured to receive packets from a network and send packets to the network;
a processor;
a memory comprising instructions executable by the processor to route packets received from the plurality of network interfaces, the method comprising:
receiving a first packet to route, wherein the first packet comprises a first Internet Protocol (IP) address;
obtaining a first route entry using the first IP address, wherein the first route entry comprises:
a first prefix,
a first route nexthop pointer (RNP) comprising an identifier for a second route entry, and
a first route nexthop generation (RNG) corresponding to a previously obtained route generation (RG) for the second route entry, wherein the previously obtained RG for the second route entry was obtained in response to an update of the first RNP;
obtaining the second route entry using the first RNP, wherein the second route entry comprises a route dependency list pointer (RDLP) and a current RG for the second route entry, and wherein the RDLP comprises an identifier for the first route entry;
determining that the dependence on the second route entry by first route entry is valid by determining that the current RG for the second route entry and the first RNG are equal;
upon determining that the dependence on the second route entry by first route entry is valid:
obtaining a first neighbor cache entry (NCE) from a first NCE pointer (NP) stored in the first route entry, wherein the first NCE comprises address resolution protocol (ARP) information corresponding to the second route entry; and
routing the first packet using the ARP information in the first NCE.

15. The router of claim 14, the method further comprising:
receiving a second packet to route, wherein the second packet comprises a second IP address;
obtaining a third route entry using the second IP address, wherein the third route entry comprises a second prefix, a gateway and a second RNP set to NULL;
locating the second route entry using the gateway;
setting the second RNP to point to the second route entry;
recording the current RG for the second route entry in a third RNG;
obtaining the first NCE using a second NP stored in the second route entry;
setting a third NP in the third route entry to point to the first NCE; and
routing the second packet using the ARP information in the first NCE.

16. The router of claim 15, the method further comprising
setting a route dependent next pointer (RDNP) in the first route entry to point to the third route entry.

17. The router of claim 16, the method further comprising
determining that a route corresponding to the second route entry is no longer valid;
setting the second RG for the second route to a condemned generation number;
obtaining the first entry using the RDLP in the second entry; and
incrementing a RG for the first route entry.

18. The router of claim 17, the method further comprising
obtaining the third entry using the RDNP in the first entry; and
incrementing a RG for the third route entry.

19. The router of claim 17, the method further comprising
receiving a third packet to route, wherein the third packet comprises a third IP address;
obtaining the first route entry using the third IP address;
comparing the current RG for the second route entry with the first RNG, wherein the current RG and the first RNG are not equal;
locating a fourth route entry using the gateway;
setting the first RNP to point to the fourth route entry;
recording a RG for the fourth route entry in the first RNG, wherein the RG for the fourth route entry is stored in the fourth route entry;
obtaining a second NCE using a NP stored in the fourth route entry;
setting the NP in the first route entry to point to the second NCE; and
routing the second packet using the ARP information in the second NCE.

20. The router of claim 14, wherein the first prefix in the first route entry is determined using at least one selected from a group consisting of Open Shortest Path First (OSPF) protocol, Intermediate System-to-Intermediate System (IS-IS) protocol, Border Gateway Protocol (BGP), and network interface configuration information.

* * * * *